United States Patent
Chatterjee et al.

(10) Patent No.: US 9,630,349 B2
(45) Date of Patent: *Apr. 25, 2017

(54) COMPACTED PELLETIZED ADDITIVE BLENDS CONTAINING A POLYMER CARRIER

(71) Applicant: INGENIA POLYMERS, INC., Houston, TX (US)

(72) Inventors: Ananda M. Chatterjee, Missouri City, TX (US); Sumitra Subrahmanyan, Houston, TX (US)

(73) Assignee: Ingenia Polymers, Inc., Houston, TX (US)

(*) Notice: Subject to any disclaimer, the term of this patent is extended or adjusted under 35 U.S.C. 154(b) by 65 days.

This patent is subject to a terminal disclaimer.

(21) Appl. No.: 14/469,092

(22) Filed: Aug. 26, 2014

(65) Prior Publication Data
US 2015/0057398 A1    Feb. 26, 2015

Related U.S. Application Data

(60) Provisional application No. 61/870,150, filed on Aug. 26, 2013.

(51) Int. Cl.
| | | |
|---|---|---|
| *B29B 9/08* | (2006.01) | |
| *B29C 43/00* | (2006.01) | |
| *C08K 5/17* | (2006.01) | |
| *C08K 5/524* | (2006.01) | |
| *C08K 5/105* | (2006.01) | |
| *C08J 3/20* | (2006.01) | |
| *B29C 43/10* | (2006.01) | |
| *B29K 23/00* | (2006.01) | |
| *B29K 105/00* | (2006.01) | |
| *B29L 31/00* | (2006.01) | |

(52) U.S. Cl.
CPC ............ *B29C 43/003* (2013.01); *B29B 9/08* (2013.01); *B29C 43/10* (2013.01); *C08J 3/203* (2013.01); *C08K 5/105* (2013.01); *B29C 43/006* (2013.01); *B29C 2043/106* (2013.01); *B29K 2023/0633* (2013.01); *B29K 2105/0008* (2013.01); *B29K 2105/0044* (2013.01); *B29K 2105/251* (2013.01); *B29L 2031/772* (2013.01); *C08J 2323/06* (2013.01); *C08J 2423/06* (2013.01); *C08K 5/17* (2013.01); *C08K 5/524* (2013.01)

(58) Field of Classification Search
CPC ............ C08J 3/20–3/226; B29B 9/08; B29B 9/12–9/14
See application file for complete search history.

(56) References Cited

U.S. PATENT DOCUMENTS

| | | | | |
|---|---|---|---|---|
| 4,147,742 A | * | 4/1979 | Castro | ............... C08J 3/226 260/DIG. 17 |
| 4,417,999 A | * | 11/1983 | Duffy | ............... C08K 3/36 252/383 |
| 4,764,428 A | * | 8/1988 | Gloyer | ............... C08K 5/098 428/402 |
| 5,773,503 A | | 6/1998 | Steen et al. | |
| 5,846,656 A | | 12/1998 | Dunski | |
| 6,033,600 A | | 3/2000 | Henkins et al. | |
| 6,515,052 B2 | | 2/2003 | Semen | |
| 6,596,198 B1 | | 7/2003 | Semen | |
| 6,800,228 B1 | | 10/2004 | Semen | |
| 9,193,838 B2 | * | 11/2015 | D'Uva | ............... C08J 3/22 |
| 2007/0075453 A1 | * | 4/2007 | Ayats | ............... B29B 9/10 264/140 |
| 2008/0076857 A1 | | 3/2008 | D'Uva et al. | |
| 2010/0152341 A1 | | 6/2010 | Chatterjee et al. | |

FOREIGN PATENT DOCUMENTS

JP    2009102633 A  *  5/2009

OTHER PUBLICATIONS

Machine Translation of JP2009-102633A. May 14, 2009.*
Rauwendaal, C. Extrusion. Encyclopedia of Polymer Science and Technology. Published online Oct. 22, 2001. John Wiley & Sons, Inc.*
Ethylene glycol safety data sheet. Sigma-Aldrich. Feb. 26, 2015.*
Erucamide. Hawley's Condensed Chemical Dictionary. John Wiley & Sons, Inc. 2007.*

* cited by examiner

*Primary Examiner* — Robert C Boyle
*Assistant Examiner* — Stephen Rieth
(74) *Attorney, Agent, or Firm* — Timothy M. McCarthy; Clark Hill PLC

(57) ABSTRACT

Improved solventless processing technology for additive blends containing a polymer carrier, including those which have high level of additives, is described. High concentrations of low-melting, sticky additives lead to phase separation and extrusion instability, such that pellets cannot be formed from such additive blends by traditional extrusion process. These blends include those with a high level of active additives that have been described in the literature as Type A Superblends. Here a polymer typically acts as the carrier of the additives. The new and improved technology involves the solid state compaction processing, using a tubular die, of such impossible-to-pelletize additive blends of the Type A composition to produce commercially useful pelletized additive blends.

20 Claims, No Drawings

COMPACTED PELLETIZED ADDITIVE BLENDS CONTAINING A POLYMER CARRIER

This application claims the benefit of U.S. Provisional Patent Application Ser. No. 61/870,150, entitled COMPACTED PELLETIZED ADDITIVE BLENDS CONTAINING A POLYMER RESIN CARRIER, filed on Aug. 26, 2013, the entire content of which is hereby incorporated by reference.

BACKGROUND

In one aspect, this invention relates to an improved processing technology for additive blends in a polymer resin carrier, including those which are highly loaded with additives, using solid state compaction processing using a tubular die.

The technology of producing masterbatches of additives in polymers has been practiced in the polymer industry for many years. In an improved version of this art, a high percentage of additives can be incorporated in the masterbatch. These blends have been described as Type A Superblends by Ingenia Polymers Inc. (Houston, Tex.). Here, the additive loading typically is in the range of 50 to 90% by weight. Such highly loaded masterbatch preparation practice is taught by S D'uva et al, in US Patent Publication No. 2008/0076857A1 (2008), the entire content of which is hereby incorporated by reference. During its processing the polymer resin carrier (10-50%) is melted, for example in a twin screw extruder. While the processing method of Type A Superblend is generally applicable to many additives, a major limitation of this technology, as has been discovered, is that for some low-melting, sticky additives, pelletization cannot be achieved by the traditional melt extrusion technology.

Compaction technology to prepare pellets of additive blends is known to those skilled in the art, e.g. A. M. Chatterjee et al, European Patent 2,373,730, issued May 8, 2013; and US Patent Publication No. US2010/0152341A1 (2010), the entire contents of both of these, namely the European patent and U.S. patent application, being hereby incorporated by reference. These patents teach a process for improving the compacted pellets' resistance to friability or attrition. This process is directed to 100% additive blends containing no polymer resin carrier.

U.S. Pat. No. 6,515,052 (Albemarle Corporation, Baton Rouge, La.), entitled "Granular Polymer Additives and Their Preparation," describes using a solvent in a compaction process to improve the yield and quality (lower friability) of a compacted additive blend including a phosphite stabilizer. A solvent (e.g. cyclohexane) is added to the dry additive blend and subsequently the mixture is processed through a pellet mill. The solvent partially solvates the phosphite stabilizer. After passing through the pellet mill, the solvent is removed. No polymer resin carrier is present.

U.S. Pat. No. 6,800,228 (Albemarle) entitled "Sterically Hindered Phenol Antioxidant Granules Having Balanced Hardness" describes using a solvent for the preparation of compacted additive blends including a phenolic antioxidant. This patent extends the technology taught in U.S. Pat. No. 6,515,052 to phenolic antioxidants. The solvent is usually alcohol, cyclohexane or a mixture thereof; adjusting the amount and ratio of the solvents can control the hardness and friability of the pellets produced. No polymer resin carrier is present.

U.S. Pat. No. 6,596,198 (Albemarle) teaches compacted pellet blends, where the stabilizer additive system comprises at least a stabilizer and a processing aid, preferably a mold release agent. The stabilizer comprises less than 50% of the combined total weight of the stabilizer and the mold release agent. No polymer resin carrier is present.

U.S. Pat. No. 6,033,600 (General Electric Company, Fairfield, Conn.) describes compacted pellet blends, typically a mixture of 10-90% penta-erythritol diphosphite, 10-90% phenolic antioxidant, 2-60% metallic stearate and 1-10% hydrotalcite. No polymer resin carrier is present.

U.S. Pat. No. 5,773,503 (1998) by W. P. Steen describes compacted pellet containing mineral filler and method for making the same. Additive blends containing talc and binder like erucamide were compacted to produce pellets. No polymer resin carrier is present.

U.S. Pat. No. 5,846,656 (Ciba Specialty Chemicals, Basel, Switzerland) covers a pellet mill type compaction process where 2-50% of a 'melt preventing compound' (binding agent) is added to a stabilizer or additive system to prevent melting of the stabilizer. The binder can be hindered phenolic antioxidant (AO) like Irganox® 1076 (BASF), glyceryl mono-stearate (GMS), oleamide, etc. Any polymer component, if present, was specified to be of less than 100 micrometer (micron) median particle size.

These references provide for low-dusting forms of additive blend pellets which can be more conveniently and accurately fed to post-reactor extrusion operations for addition to a polymer in a polymer resin producing plant. Such solid additive blend pellets are added directly to a polymer stream into an extruder or other melt processing device, whereby the polymer is melted and the additives are blended into the molten polymer, which is subsequently pelletized, thus producing polymer resin pellets containing desired concentration of additives.

What is needed, therefore, is a method for processing pellet blends of high concentrations of low melting, sticky additives, including a polymer resin carrier, which blends cannot be processed into pellets successfully by traditional melt extrusion processes. The low melting sticky additives have other attractive properties, e.g. as an antistatic agent or antioxidant for polymers.

SUMMARY

One general aspect of the present invention pertains to a new, innovative, and unconventional solvent-free method for processing additive blends containing polymer and also low-melting sticky additives, into pellet form. In this method, the polymer resin carrier is not melted, yet a additive/polymer blend composition is produced by this novel and new process.

Due to the low-melting, sticky or gummy nature of some of the additives, these blends cannot be processed by the traditional melt extrusion process to produce pellets. Surprisingly, a different process involving solid state compaction, which is normally applicable in the industry for 100% additive or actives blend (and no polymer resin carrier), can be used for producing the impossible-to-pelletize Type A composition blends. The new and novel feature involves a new processing technique applied for a Type A composition blend which is normally produced by melt extrusion process. Without this compaction technology, the blends containing low-melting sticky intractable additives could not be processed into pellet form. The improved method avoids the melt extrusion process.

The additives which can be processed using the improved method are typically low-melting solids or liquids, e.g. octadecyl bis(2-hydroxyethyl) amine, an antistatic agent, which is available from AkzoNobel Chemicals (Dallas, Tex.) as ARMOSTAT 1800 which has a low melting temperature of about 50° C. measured by a differential scanning calorimeter (DSC8500 from Perkin-Elmer Corp). Other low melting additives that can be processed using this method are ARMOSTAT 600 (AkzoNobel), which is an alkyl (C14-C18) bis(2-hydroxyethyl) amine antistatic agent; dilauryl thio-dipropionate (DLTDP), octadecyl-3(3,5-di-tertiary-butyl-4-hydroxyphenyl)propionate which is available as antioxidant Irganox 1076 from BASF. Generally, the additives that can be processed, as blend components, using the improved method are antistatic agents, thiodipropionate antioxidants, hindered phenolic antioxidants, processing stabilizers, acid neutralizers, hindered amine light stabilizers (HALS), UV light absorbers, metal deactivators, slip agents, antiblock agents, nucleating agents, lubricants, mold release agents, flame retardants, or mixtures of these. The melting temperature of at least one of the additives is preferably below about 70° C., and more preferably below about 60° C., but above 20° C. The low-melting additive typically tends to create sticky, gunky intractable melt during extrusion processing, such that above a critical concentration of such additives the total blend becomes unextrudable, such that pellets cannot be produced.

The current method uses compaction technology to make pellets which have a polymer resin carrier present. The preferred route of practicing this new compaction technology involves use of granular polymer resin. The polymer resin carrier should have desired median particle size greater than about 350 micron, preferably greater than about 700 micron and more preferably greater than about 1000 micron, but less than 4000 micron. The granular polymer resin can be low density polyethylene (LDPE), high density polyethylene (HDPE), linear low density polyethylene (LLDPE), polypropylene, poly(1-butene), or others. In the present method, no solvent is used in the compaction process. This technology extends the scope of commercial application of additive blends for the polymer-producing industry.

DETAILED DESCRIPTION OF PREFERRED EMBODIMENTS

One embodiment of the present invention involves a solventless method for processing an additive blend into pellets, comprising: mixing one or more additives with granular polymer resin without a solvent to produce a starting or initial powder blend; and processing the starting powder blend in a compaction mill using a tubular die to produce pellets, wherein at least one of the additives has a melting temperature below about 70° C., and wherein the granular polymer resin has a median particle size greater than about 350 microns, but below about 4000 microns and wherein the pellets have an attrition index of greater than about 90%. Preferably at least one of the additives has a melting temperature below about 60° C., and the granular polymer resin has a median particle size greater than about 700 microns, or more preferably greater than about 1000 microns. Such a blend cannot be processed into pellets by a traditional melt extrusion process.

The one or more additives comprise hindered phenolic antioxidants, processing stabilizers like phosphites and phosphonites, thiodipropionate antioxidants, acid neutralizers, hindered amine light stabilizers (commonly referred to as HALS), UV light absorbers, antistatic agents, antifog agents, metal deactivators, slip agents, antiblock agents, nucleating agents, lubricants, mold release agents, polymer processing aids, flame retardants, antimicrobial agents, pigments, fillers, or mixtures thereof.

One of the additives can be octadecyl bis(2-hydroxyethyl) amine antistatic agent in an amount of about 10% to about 50% by weight of the starting powder blend. The granular polymer resin is low density polyethylene (LDPE) resin granules having a median particle size of greater than about 370 microns in an amount of about 10% to about 45% by weight of the starting blend. Unless otherwise stated, all recited percentages in this disclosure are by weight of the starting powder blend.

The step of processing the starting powder blend using compaction in a tubular die involves using a pellet mill to process the starting powder blend into pellets.

In one embodiment of the present invention, a compacted pelletized additive blend is produced, the blend comprising 8-55% ethoxylated amine, 10-30% phenolic antioxidant, 10-30% phosphite antioxidant, 5-15% acid neutralizing agent, and 5-20% polymer resin. The blend cannot be extruded into pellets by a traditional melt extrusion process. The ethoxylated amine is octadecyl bis(2-hydroxyethyl) amine; or alkyl (C12-C14) bis(2-hydroxyethyl) amine, saturated; or alkyl (C14-C18) bis(2-hydroxyethyl) amine, or mixtures thereof. The phenolic antioxidant is octadecyl-3 (3,5-di-tertiary-butyl-4-hydroxyphenyl) propionate; tetrakis [methylene-3(3,5-di-tertiary butyl-4-hydroxyphenyl) propionate]methane; tris(3,5-di-tertiary butyl-4-hydroxybenzyl) isocyanurate; 1,3,5-trimethyl, 2,4,6 tris (3,5 di-tertiary butyl-4-hydroxybenzyl) benzene; 1,2-bis(3,5-di-tertiary butyl-4-hydroxy hydrocinnamoyl) hydrazine; 1,3,5-tris(2,6 dimethyl 3-hydroxy 4-tertiary butyl benzyl) isocyanurate; 2,2'ethylidene bis(4,6-di-tertiary-butyl phenol); or mixtures thereof. The phosphite or phosphonite antioxidant is tris (2,4-di-tertiary-butyl phenyl) phosphite; bis(2,4-di-tertiary-butyl phenyl) pentaerythritol diphosphite; bis(2,4-dicumyl phenyl) pentaerythritol diphosphite; tetrakis(2,4-di-tert-butylphenyl)-1,1-biphenyl-4,4'-diylbisphosphonite; or mixture thereof. The acid neutralizer is magnesium aluminum hydroxycarbonate hydrate; calcium stearate; zinc stearate; sodium stearate; lithium stearate; zinc oxide; or mixtures thereof.

A compacted pelletized additive blend of the present invention includes a polymer resin carrier, wherein the blend comprises 30-50% thiodipropionate antioxidant of melting point lower than 70° C., 10-20% phenolic antioxidant, 10-20% phosphite antioxidant, 3-7% acid neutralizer, and 20-30% polymer resin, and wherein the blend cannot be extruded into pellet by a traditional melt extrusion process. The thiodipropionate antioxidant is dilauryl thiodipropionate; or penta-erythrityl tetrakis (3-lauryl thiopropionate); or dimyristyl thiodripiopionate; or distearyl thiodipropionate; or lauryl-stearyl thiodipropionate; or mixtures thereof. The phenolic antioxidant is tetrakis[methylene-3(3, 5-di-tertiary butyl-4-hydroxyphenyl)propionate]methane; octadecyl-3(3,5-di-tertiary-butyl-4-hydroxyphenyl) propionate; tris(3,5-di-tertiary butyl-4-hydroxybenzyl) isocyanurate; 1,3,5-trimethyl, 2,4,6 tris (3,5 di-tertiary butyl-4-hydroxybenzyl) benzene; 1,2-bis(3,5-di-tertiary butyl-4-hydroxy hydrocinnamoyl) hydrazine; 1,3,5-tris(2,6 dimethyl 3-hydroxy 4-tertiary butyl benzyl) isocyanurate; 2,2'ethylidene bis(4,6-di-tertiary-butyl phenol); or mixtures thereof.

One aspect of the present invention pertains to an improved solventless or solvent-free method of processing an additive blend containing low-melting, sticky additives, and a polymer resin, into pellets. These blends are typically not extrudable to pellet using conventional melt extrusion method. The inventive method uses compaction mill and a granular polymer resin but does not use a solvent. In a compaction process using solvent the solvent must be removed, such that the final pellet of additive blend is free from solvent contaminant. Even low concentration of solvent left in the pellet can have adverse effect on the pellet, as the solvent is undesirable and can be detrimental to the functioning of the additive in polymer to which the additive blend will be added. Some of the compaction processes of the past have such limitation. The removal of the solvent incurs additional cost, and therefore has an economic disadvantage associated with it. The present method does not use a solvent, and hence the complications of initially adding and later removing the same solvent are not present in this improved process.

In the improved processing method, the non-melting (under compaction conditions) polymer resin component is pelletized in the solid state with the other additive components present. Powder compaction mills use mechanical forces of compression, generating temperatures much lower than those typically found in melt extrusion process.

Besides the prime yield of pellets, the attrition or friability characteristics of a compacted pellet are very important to its commercial success. Pellets which are prone to generating dust during shipping and storage represent a loss in value to the customer.

The pellet compaction process utilizes various equipment configurations. The mills with rotating dies and fixed rollers are manufactured by companies like California Pellet Mill or CPM (Crawfordsville, Ind.) and others. The compaction mills with fixed die, rotating roller are manufactured by Amandus Kahl (Reinbek, Germany). Both processes can produce solid pellets of additive blends by compression forces, by forcing the solid powder blend through circular orifices or dies to produce a solid strand which is mechanically cut or broken into pellets.

The first step in this compaction process is the feeding of the additives to the pellet mill. The individual additives may be pre-blended and then fed to the afore-mentioned pellet mill or they may be metered independently. Pre-blending may be accomplished by weighing components and mixing them together. Blending may be accomplished by any means known in the art, including, but not limited to hand mixing, tumble blending, ribbon blending, and high-intensity mixing. Metering additives independently can be accomplished volumetrically or by loss-in-weight feeder by any means known in the art.

The additives or the additive blend are then fed into a pellet mill. The pellet mill may be of any type known to those in the art. Manufacturers of such types of press or mills include California Pellet Mill (CPM); Amandus Kahl and Munch (Germany). Such pellet mills are described in W. Pietsch, "Agglomeration Processes: Phenomena, Technologies, Equipments", Chapter 8.4, pages 277-292 (2002), Wiley-VCH Verlag. The pellet mill forms a pellet by forcing the additive blend through (a) a rotating cylindrical ring die and a fixed roller, e.g. CPM and Munch mills or (b) a fixed flat die and rotating rollers, e.g. Kahl mill. The metal die has a cylindrical shaped unit with holes through which the feed is forced to produce pellets by compaction or compression process. The cylindrical pellets formed are considerably larger than the particles of the granular or powder additives in the feed.

Another aspect of the current invention also pertains to a method for preparing a polymer resin. The compacted additive blend pellet described above is mixed with a base polymer resin, and fed into a mixing device like an extruder in a polymer producing plant. The molten polymer strand is cooled to produce pellets of the additivized polymer. The blended polymer strand is allowed to cool and harden, to produce the final polymer resin pellets.

Yet another aspect of the current invention pertains to a solventless compaction process for producing compacted pelletized additive blends containing a polymer resin carrier. The compacted mixture of additive-containing pellets (or additive blend) is fed into an extruder or other mixing device and forced through a die and cut by knife to produce plastic pellets. During mixing, one or more of the additives is melted, such that the mixing temperature is above the melting temperature of some of the additives. In some cases, none of the additives may melt in the polymer melt matrix during extrusion. The mixing step is carried out typically in a twin-screw or single screw extruder, whereby the dispersion and processing ease of the additives are improved. This leads to an efficient mixing of the additives within the extruder at regions such as between the extruder screw and barrel wall or in mixing sections containing kneading blocks or other mixing devices.

The low-melting ethoxylated amine additive can be added to the additive-polymer mixture by various methods, e.g. adding as solid granules or by spraying molten ethoxylated amine onto the polymer-additive blend, then cooling the blend to make polymer-additive mixture for the next step of compaction in a mill. The molten amine can be prepared by heating the solid amine in a drum or other container, such that a pumpable liquid is available.

EXAMPLES

To demonstrate the innovative and effective nature of the method, the same additive plus granular polymer blends were processed by extrusion (comparative) and by a tubular compaction process. The results of the extrusion processing experiment were compared with those of processing the same blends using a California Pellet Mill (CPM) CL3 laboratory pellet mill or Kahl compaction mill laboratory model 14-175. The resulting compacted additive blend pellets were then subjected to attrition (friability) and other tests.

The CPM CL3 pellet mill has a vertical ring-type die, mounted on the main shaft driven through V-belts by the main drive motor. The roller is mounted on a roller shaft. The latter rotates in bearings encased in the pellet chamber housing. The roller is driven through contact with the rotating die. The starting powder blend is compressed through the die, and is forced out as pellets. Pellets are broken or cut off by a knife. Pellet length is controlled by the set distance between the die and knife. The additive blend is fed into the CL3 mill by a constant speed feeder screw driven by a 0.25 HP motor, as described by the vendor. Feed rate from the hopper is controlled by an adjustable electrically operated vibratory feeder which discharges the material into the feeder screw.

The Kahl 14-175 pellet mill has a horizontally placed flat die (with circular holes) which stays in fixed position inside the mill chamber; the dual roller rotates over the die thereby compacting the powder blend into pellets. The powder blend is fed to the mill chamber from a K-Tron type feeder through a horizontal auger. The K-Tron feeder vessel has a rotating blade for mixing the additive blend feed material. The diameter of the die is 175 mm. The roller has diameter of 130 mm, and width of 29 mm, as described by the vendor. Roller speed is about 0.6 meter/sec. The perforated die area is 106 cm$^2$.

To determine the attrition or friability of the compacted Type A composition pellets, an attrition test of the samples was performed by first weighing 100 grams of the pellets. The pellets were then placed in the top of a stack of sieve trays with 0.265, 4, 8, 14, 18, 120, and 200 mesh screens with a solid pan on the bottom of the stack. This stack of sieve trays was then placed in a RO-TAP test sieve shaker (W. S. Tyler, Mentor, Ohio) and shaken for 10 minutes. Then the contents of each pan was weighed. The trays were emptied and in the next experiment some of the sieves were loaded with steel ball bearings. Seven ⅝" ball bearings were loaded into the 4 mesh sieve, while the 8 mesh sieve had three balls of the same size. The 4, 8, 14, and 18 mesh trays also contained 20, 10, 10, and 5 smaller ¼" ball bearings, respectively. The top pan was then reloaded with the desired quantity of pellets and again the sample was shaken for 10 minutes. Then the balls were unloaded and the contents of each tray were weighed. The attrition index was calculated using the procedure described in US Patent Publication No. US2010/0152341. From a typical particle size distribution curve the median particle size of the initial pellets (without balls) is reported as $PS_0$, and median particle size of the pellets after attrition (with balls) is reported as $PS_1$. The attrition index (AI) is defined as:

$$AI=(PS_1/PS_0)\times 100,$$

expressed as a percentage.

Higher attrition index (AI) indicates greater resistance to friability or attrition, that is less tendency to generate powder from pellet after handling and storage. AI of 100% indicates a ideal or perfect property, where no powder is generated after impact with steel balls. In the other extreme, 0% AI indicates conversion of pellets to all powder after the attrition test.

For measuring pellet density, the length and diameter of each pellet was measured and then used to compute the volume of the pellet. A total of ten samples were taken and then used to compute an average density for the pellet, using the mass of the pellet by weighing. Hardness of the compacted pellet produced was measured by a Kahl hardness tester. This is a plunger- or syringe-like testing apparatus which is used to apply pressure on a pellet mounted in the syringe, till the pellet breaks. Melting temperature of additives was measured by a differential scanning calorimeter (DSC8500, from Perkin-Elmer Corporation), using 20° C./minute heating rate under nitrogen.

The polymer used in the first set of experiments was low density polyethylene (LDPE) resin granules having a median particle size of about 370 microns (measured by sieve analysis); the LDPE had a melt index (MI) of 7, measured by ASTM D-1238 condition E, and 0.918 gm/cc density. IRGANOX 1076 (BASF, Basel, Switzerland) is a phenolic antioxidant, IRGAFOS 168 (BASF) is a phosphite antioxidant and processing stabilizer, and hydrotalcite HYCITE 713 (Clariant) is an acid neutralizer. Armostat 1800 (AkzoNobel Chemicals, Netherlands) is an antistatic agent. For Examples 1-5 (processing by extrusion method) and 6-11 (processing by compaction method), a description of the formulation components of the blends, as well as their melting temperature (Tm) range can be found in Table 1 below. The solid ARMOSTAT 1800 was chipped off in small pieces and then mixed with LDPE, using an Oster 14-speed blender. The resulting powder blend was then hand tumbled with the rest of the ingredients to produce the desired starting blend to be processed by extrusion or compaction procedure indicated below.

TABLE 1

Blend composition containg additives and polymer resin

| Formulation | Wt % | $T_m$ (° C.) |
|---|---|---|
| IRGANOX 1076 phenolic antioxidant | 20.0 | 50-55 |
| IRGAFOS 168 phosphite antioxidant | 20.0 | 180-186 |
| Hydrotalcite HYCITE 713 acid neutralizer | 10.0 | >300 |
| ARMOSTAT 1800 (varied %) antistatic agent | 5 to 40 | 48-52 |
| LDPE resin (varied %), granular powder, 7 Melt Index (MI) | 10 to 45 | 106-108 |

Irganox 1076 is octadecyl-3(3,5-di-tertiary-butyl-4-hydroxyphenyl)propionate, a phenolic antioxidant (AO). Irgafos 168 is tris (2,4-di-tertiary-butyl phenyl)phosphite. Hycite 713 is magnesium aluminum hydroxy-carbonate hydrate. Armostat 1800 is octadecyl bis(2-hydroxyethyl) amine.

Testing the processability of compacted additive blend pellets containing a polymer resin was conducted using 5%, 10%, 15%, and 20% wt ARMOSTAT 1800 in a compaction mill. These blends were compared to the corresponding blends processed using a Coperion ZSK-25 (Coperion GmbH, Stuttgart, Germany) 25 mm diameter co-rotating twin screw extruder (40:1 length/diameter ratio) at 200 RPM screw speed.

Extrusion Results with Low Melting Ethoxylated Amine Additive

The extrusion examples below are presented as comparative experiments, showing the non-suitability of processing the additive/polymer blends via extrusion route. Compared to such non-attractive extrusion process of low or no utility to produce pellets of desired composition described, the inventive compaction process was demonstrated to produce pellets with attractive properties and utility.

Example 1

The formulation used for Example 1 is set forth below:

IRGANOX 1076 phenolic AO, 20%

IRGAFOS 168 phosphite AO, 20%

Hydrotalcite HYCITE 713 acid neutralizer, 10%

ARMOSTAT 1800 antistatic agent, 5%

LDPE resin granular powder 7 MI (45%)

This formulation with 5% ARMOSTAT was extruded in a twin screw extruder using the temperature profile shown in Table 2 below. A Coperion ZSK-25 co-rotating twin screw extruder (40:1 length/diameter ratio) was used at 200 RPM screw speed, 330 psi pressure, with a 4-hole die. The extruded strands did not phase separate. The strands passed through the water bath and were pelletized successfully.

TABLE 2

Extrusion conditions used to process the additive/polymer blends with composition described above

| Temperature | 5% ARMOSTAT 1800 antistat (Ex 1) | 10% ARMOSTAT 1800 antistat (Ex 2) | 15% ARMOSTAT 1800 antistat (Ex 3) | 20% ARMOSTAT 1800 antistat (Ex 4) |
|---|---|---|---|---|
| Zone 2 (° C.) | 51 | 53 | 49 | 50 |
| Zone 3, 4 (° C.) | 80 | 80 | 74 | 76 |
| Zone 5, (° C.) | 130 | 100 | 129 | 130 |
| Zone 6, 7 (° C.) | 130 | 125 | 96 | 45 |
| Zone 8, (° C.) | 135 | 135 | 135 | 135 |
| Zone 9, 10 (° C.) | 135 | 135 | 135 | 135 |
| Die, (° C) | 135 | 135 | 113 | 135 |
| Melt temp, (° C.) | 137 | 135 | 110 | 138 |

Example 2

This formulation was the same as in Example 1, except that it had 10% ARMOSTAT 1800 and 40% LDPE. A Coperion ZSK-25 co-rotating twin screw extruder (40:1 length/diameter ratio) was used at 200 RPM screw speed, 314 psi pressure. No phase separation was detected, but the strands were coarse and not well formed; strand formation was often interrupted. After melting, ARMOSTAT 1800 was sticky and gunky in the extruder, thus negatively affecting the strength of extruded strands. The strands leaving the die had very low melt strength and could not be pulled through a water bath. They broke in the water bath. As a result, pellets could not be produced. The melt extrusion with 10% Armostat 1800 was not successful.

Example 3

This formulation was the same as in Example 1, except that it had 15% ARMOSTAT 1800 and 35% LDPE. A Coperion ZSK-25 co-rotating twin screw extruder (40:1 length/diameter ratio) of 25 mm diameter was used at 200 RPM screw speed, 317 psi pressure. The blend exhibited significant phase separation in the strand. Some material exited through the vent port; there was some spitting at the die, indicating an unstable extrusion process. The strands were thin, had low viscosity, and could not be pulled through the water bath. As a result pellets could not be produced. The melt extrusion with 15% Armostat was not successful.

Example 4

This formulation was the same as in Example 1, except that it had 20% ARMOSTAT 1800 and 30% LDPE. A Coperion ZSK-25 co-rotating twin screw extruder of 25 mm diameter (40:1 length/diameter ratio) was used at 200 RPM screw speed, 328 psi pressure. With 20% ARMOSTAT phase separation in strands was observed. The die was spurting out material. A majority of the material came out of the vent port of the extruder. The ARMOSTAT 1800 discolored in the extruder, forming a yellow color. The strands could not be pulled through the water bath, and as a result pellets could not be produced. The melt extrusion with 20% ARMOSTAT 1800 was not successful.

With 15% and 20% ARMOSTAT 1800 (see above) significant melt leakage though the vent port at the end of the extruder was observed, as well as spitting at the die. The amount of material observed to leave the vent port was higher with the 20% ARMOSTAT 1800 compared to the 15% Armostat 1800 case, although it was unacceptably high in both cases. The melt leaving the vent port (cooled in air) was viscous enough to not flow freely over the top of the vent port, but instead tended to pile up at the vent port outlet. The melt extrusion process was unstable in both cases.

Example 5

In a comparative example, a blend with 0% ARMOSTAT and 50% LDPE (low density polyethylene), with the other additives as in Table 1, was extruded successfully into pellets, using a Coperion ZSK-25 co-rotating twin screw extruder (40:1 length/diameter ratio) at 200 RPM screw speed and 330 psi pressure. The blends with no Armostat 1800 are outside the scope of this disclosure.

Compaction Results with Low Melting Ethoxylated Amine Additive

The compaction experiments of Examples 6 through 11 were run in a California Pellet Mill (CPM), Crawfordsville, Ind., laboratory model CL3. This is a compaction mill with a vertical rotating die and fixed roller, for producing pellets from powder blend via a compression process. The compaction of the powder is achieved via forcing the powder mixture through a tubular die or orifice. The additive powder blends described further below (Examples 6 through 11) were loaded into the feed hopper of the laboratory model California Pellet Mill with a rotating die. During processing the motor speed was set to 30 Hz and the vibratory feeder was set to near the maximum allowable feed rate which would not cause material to back up from the die. The packout temperature of the pellets exiting the compaction mill was measured by a handheld infrared sensor remotely pointed at the pellets.

The die used had ⅛ inch diameter (D) and ¾ inch length (L), that is, L/D=6. The additives were first weighed and blended by tumbling in a plastic bag by hand. The formulations of Examples 6 through 11 were similar to those as in Example 1, except that the ARMOSTAT 1800 and LDPE concentrations (varied) are those shown in Table 3 below.

Example 6

The experimental conditions for feed preparation, compaction processing and test procedures are described above. With 5% ARMOSTAT 1800 a successful compaction run was conducted, as indicated by the pellet attrition and other test results shown in Table 3 below. This experiment compares with melt extrusion Example 1.

TABLE 3

CPM compaction processing conditions and resulting pellet properties

| Parameter/property | Ex 6 | Ex 7 | Ex 8 | Ex 9 | Ex 10 | Ex 11 |
|---|---|---|---|---|---|---|
| Wt % Armostat 1800 | 5 | 10 | 15 | 20 | 30 | 40 |
| Wt % LDPE | 45 | 40 | 35 | 30 | 20 | 10 |
| Prime yield of pellet, % | 40.3 | 78.3 | 68.5 | 95.1 | 91.9 | 96.8 |
| Packout temp, C. | 39 | 38 | 36 | 39 | 34.0 | 38.0 |
| Throughput rate (lb/hour) | 65.7 | 106.6 | 124.1 | 196.6 | 126.3 | 139.1 |
| Feeder Speed (Hz) | 30 | 30 | 30 | 30 | 30 | 30 |
| Motor Load, % | 49 | 54 | 55 | 61 | 71 | 65 |
| Feed bulk density (g/100 cc) | 45.6 | 45.9 | 48.1 | 48.8 | 53.6 | 54.2 |
| Pellet bulk density (g/100 cc) | 34.1 | 32.9 | 38.0 | 40.8 | 42.2 | 45.8 |
| Pellet size (Pellets/gm) | 22.6 | 43.8 | 42.4 | 30.4 | 19.8 | 28.2 |
| Pellet density (g/100 cc) | 76.5 | 71.1 | 79.7 | 83.8 | 95.9 | 98.6 |
| Pellet Attrition Index (%) | 97.8 | 97.7 | 96.6 | 97.6 | 98.9 | 99.3 |
| Pellet Kahl hardness (Kg) | 2.7 | 2.2 | 3.1 | 2.7 | 3.9 | 3.5 |

Example 7

The experimental conditions including test procedures are described above. With 10% ARMOSTAT 1800 a successful compaction run in the laboratory model CPM was conducted, as indicated by the processing profile, attrition and other test results of pellet shown in Table 3. Improvement was demonstrated over the unsuccessful melt extrusion method of Example 2.

Example 8

The experimental conditions including test procedures are described above. With 15% ARMOSTAT 1800 a successful compaction run was conducted, as indicated by the attrition and other test results in Table 3. Improvement was demonstrated over the unsuccessful melt extrusion method of Example 3.

Example 9

The experimental conditions including test procedures are described above. With 20% ARMOSTAT 1800 a successful compaction run was conducted, as indicated by the attrition and other test results in Table 3. Improvement was shown over the unsuccessful melt extrusion method of Example 4 with 20% Armostat 1800.

Example 10

The experimental conditions including test procedures are described above. With 30% ARMOSTAT 1800 a successful compaction run was conducted, as indicated by the attrition and other test results shown in Table 3. In contrast, the melt extrusion method was not successful even at 20% Armostat 1800 (see Example 4).

Example 11

The experimental conditions including test procedures are described above. With 40% ARMOSTAT 1800 a successful compaction run was conducted, as indicated by the attrition and other test results shown in Table 3. In contrast, the melt extrusion method was not successful even at 20% Armostat 1800 (see Example 4).

Example 12

In a comparative example, a blend with 0% ARMOSTAT 1800, 50% LDPE, 20% IRGANOX 1076, 20% IRGAFOS 168 and 10% HYCITE 713 was compacted successfully into pellets using a laboratory model California Pellet Mill. The blends with no Armostat 1800 are outside the scope of this disclosure.

Example 13

A blend with 45% ARMOSTAT 1800, 5% granular LLDPE (2 melt index), 20% IRGANOX 1076, 20% IRGAFOS 168, 10% HYCITE 713 was tested. The blend has 95% actives or additives concentration. The LLDPE resin had about 950 micron median particle size. It was compacted successfully into pellets using a laboratory model California Pellet Mill, using ⅛ inch diameter×¾ inch long die. Prime yield of pellet was 96.6%, packout temperature 35° C., throughput rate 288.6 lb/hour. Pellet properties were as follows: bulk density 47.1 g/100 cc; pellet size 21.4 pellets/gm; pellet density 98.4 g/100 cc; Attrition index 98.7%; Kahl hardness 4.1 Kg. This is a Type A composition Superblend with 95% actives or additives content. This is significant compared to previous disclosures in which the polyolefin was specified to be of less than 100 micron particle size.

The additive blends processed in Examples 6 through 11 and 13 showed an attrition index greater than about 95%, ranging from 96.6% to 99.3%. This indicates the pellets formed using a compaction process have very favorable attrition or friability characteristics. This is contrasted with the poor results obtained by attempts to use the melt extrusion process, even with the additive blend containing only 10% Armostat 1800.

Extrusion and Compaction Results with Low-Melting Thiodipropionate Antioxidant

For the Examples 15 and 17, different additive formulations with low-melting additives recipes were used, and processed successfully in a Kahl laboratory compaction mill, described above, to produce compacted pellets. The corresponding comparative unsuccessful melt extrusion tests are described in Examples 14 and 16, respectively. The Kahl mill utilizes a fixed horizontally placed die and rotating rollers.

Example 14

The recipe used in Examples 14 and 15 was:
DLTDP, thiodipropionate antioxidant, 40%
Irganox 1010 phenolic antioxidant, 15%
Irgafos 168 phosphite antioxidant, 15%
DHT4A hydrotalcite acid neutralizer, 5%
Polypropylene (PP) granular resin (2.7 MFR homopolymerl), 25%

DLTDP is dilauryl thiodipropionate, received from Reagens (Bologna, Italy) as Arenox DL flakes. This is a low-melting additive, with melting temperature of 42° C., as measured by a differential scanning calorimeter (DSC8500, Perkin-Elmer Corporation). DHT4A is magnesium aluminum hydroxy-carbonate hydrate, received from Kisuma Chemical (Veendam, Netherlands). The PP homopolymer of 2.7 melt flow rate (MFR), by ASTM D-1238 condition L, had a median particle size of about 1030 micrometer, measured by sieve analysis. The powder blend of the above additives with PP was hand-tumbled to produce the desired starting blend to be processed by extrusion (Example 14) or compaction (Example 15) method.

For extrusion (Example 14) of the blend with 40% DLTDP, a Coperion ZSK-25 co-rotating twin screw extruder (40:1 length/diameter ratio) was used at 200 RPM screw speed, 332 psi pressure. The extrusion zone temperatures are shown in Table 4. The extrusion with 40% DLTDP was not successful. The strand from the die showed phase separation. Most die holes were plugged with solid, and liquid came out of the other die holes. The strands could not be pulled through a water bath; as a result, pellets could not be produced from this blend. Note that this is blend formulation with 75% active additives, which could not be processed into pellet by the traditional extrusion route.

Example 15

The same blend with 40% DLTDP was successfully compacted into pellets using a Kahl flat die pelleting press laboratory model 14-175 with two rollers. The die diameter is 175 mm. The roller diameter was 130 mm; roller width 29 mm. The drive motor had 3 kWatt/min. A K-Tron feeder, attached to the pelleting press, delivered the powder mix of additives and polymer to the compaction chamber. The blend was charged into the feeder of the Kahl pelleting mill. An auger delivered the blend into the compaction chamber. In the Kahl mill the die is stationary and the roller rotates in contact with the die, thus generating compaction or compression force inside a tubular orifice. The die used had a 3 mm diameter hole and 6 mm pressway thickness; that is pressway/diameter ratio of 2.0. The blade clearance was 6 mm. The blade orientation behind the roller was 20 degrees. The cylindrical mass exiting the die was cut by a knife blade to produce pellets, typically 6-6.4 mm in length and 2.7-3 mm in diameter. Other experimental conditions and properties of the resulting compacted pellet are shown in Table 5.

Extrusion and Compaction Results with Low-Melting Phenolic Antioxidant

For examples 16 and 17 the following recipe was used:
Irganox 1076 phenolic antioxidant, 50%
Irgafos 168 phosphite antioxidant, 40%
Ca stearate acid neutralizer Faci SP, 5%
LLDPE granular resin, GF218, 2 MI, 5%.

The Irganox 1076 is a low melting phenolic antioxidant additive, with melting temperature of about 53° C. The granular butene-based LLDPE resin was of 2 MI, 0.92 gm/cc density, with a median particle size of about 950 micrometer, measured by sieve analysis.

Example 16

The extrusion conditions of this example are shown in Table 4. This extrusion with high concentration of this low melting additive (Irganox 1076) was not successful. The additives showed phase separation, and a low viscosity soupy extrudate was produced. The extrudate could not be pulled through a water bath, and as a result no pellet could be produced.

Example 17

The above blend was successfully compacted into pellets using a Kahl laboratory model pelleting press, described in Example 15. The blend was charged into the feeder of the Kahl laboratory mill. An auger delivered the blend into the compaction chamber. In the Kahl mill the die is stationary and the roller rotates in contact with the die, thus generating compaction or compression force inside a tubular orifice. The die used had 3 mm diameter hole and 6 mm pressway thickness; that is pressway/diameter ratio of 2.0. The cylindrical mass was cut by a knife blade to produce pellets, typically mm long and mm in diameter. The blade clearance was 6 mm. The blade orientation behind the roller was 20 degrees. The roller gap was 0.5 mm. The experimental conditions and properties of the resulting pellets from compaction in the Kahl mill are shown in Table 5.

TABLE 4

Extrusion Conditions For Blends

| Zone Temperatures (° C.) | With 40% DLTDP thiodipropionate antioxidant (Ex 14) | With 50% Irganox 1076 phenolic antioxidant (Ex 16) |
|---|---|---|
| Zone 2 | 43 | 35 |
| Zones 3 and 4 | 96 | 75 |
| Zone 5 | 171 | 125 |
| Zones 6 and 7 | 177 | 126 |
| Zone 8 | 181 | 125 |
| Zones 9 and 10 | 180 | 125 |
| Die Temperature | 185 | 127 |
| Melt Temperature | 175 | 128 |

TABLE 5

Compaction Conditions Of Laboratory Model Kahl Mill And Pellet Properties

| Parameter/Property | With 40% DLTDP thiodipropionate AO (Ex 15) | With 50% Irganox 1076 phenolic AO (Ex 17) |
|---|---|---|
| Prime Yield, % | 82.7 | 91.7 |
| Packout Temperature, ° C. | 29 | 34 |
| Throughput Rate (lb/hour) | 97.2 | 85.6 |
| Pelletizer RPM | 133.2 | 134.6 |
| Pelletizer Load (%) | 27 | 33.4 |
| Feeder RPM | 200 | 175 |
| Current Draw (A) | 3.07 | 3.45 |
| Feed Bulk Density (g/100 cc) | 47.2 | 57.4 |
| Pellet Bulk Density (g/100 cc) | 43.1 | 48.3 |
| Pellet Size (Pellets/gm) | 31 | 39 |
| Pellet Density (g/100 cc) | 90.7 | 89.9 |
| Pellet Attrition Index (%) | 97.7 | 95.4 |
| Pellet Kahl Hardness (kg) | 1.9 | 4.5 |

REFERENCES CITED

The following documents and publications are hereby incorporated by reference.

U.S. and Foreign Patent Documents

U.S. Patent Publication No. 2008/0076857A1
U.S. Patent Publication No. 2010/0152341A1
U.S. Pat. No. 6,515,052
U.S. Pat. No. 6,800,228
U.S. Pat. No. 6,596,198,
U.S. Pat. No. 6,033,600
U.S. Pat. No. 5,773,503
U.S. Pat. No. 5,846,656

Non-Patent References

1. A. M. Chatterjee, Z. Liu, S. Subrahmanyan, and S. D'Uva, "Advancements in Additive Blends Technology for Polymers", Proceedings of Society of Plastics Engineers (SPE) Polyolefins 2010 International Conference, Houston, Tex., February, 2010.
2. W. Pietsch, "Agglomeration Processes: Phenomena, Technologies, Equipments", Chapter 8.4, pages 277-292 (2002).

What is claimed is:

1. A compacted additive blend pellet, containing a polymer resin, produced by a method comprising:
   mixing one or more additives with a granular polymer resin and without a solvent, to produce a starting or initial powder blend, the starting blend comprising 8-55 wt % an ethoxylated amine antistatic agent having a melting temperature below about 70° C. and above about 20° C., 10-30 wt % a phenolic antioxidant, 10-30 wt % a phosphite or phosphonite antioxidant 5-15 wt % an acid neutralizing agent, and 5-60 wt % granular polymer resin; and
   compacting the starting powder blend using a pelletizing mill with tubular die to produce compacted additive pellets by compression force;
   wherein the granular polymer resin has a median particle size greater than about 350 microns and less than about 4000 microns, and
   wherein the compacted additive pellets have an attrition index of greater than about 90%.

2. The compacted pelletized additive blend of claim 1, wherein the ethoxylated amine antistatic agent is selected from the group consisting of octadecyl bis(2-hydroxyethyl) amine, saturated C12-C14 alkyl bis(2-hydroxyethyl) amine, C14-C18 alkyl bis(2-hydroxyethyl) amine, and mixtures thereof.

3. The compacted pelletized additive blend of claim 1, wherein the phenolic antioxidant is selected from the group consisting of tetrakis[methylene-3(3,5-di-tertiary butyl-4-hydroxyphenyl) propionate] methane, octadecyl-3(3,5-di-tertiary-butyl-4-hydroxyphenyl) propionate, tris (3,5-di-tertiary butyl-4-hydroxybenzyl) isocyanurate, 1,3,5-trimethyl, 2,4,6 tris (3,5 di-tertiary butyl-4-hydroxybenzyl) benzene, 1,2-bis (3,5-di-tertiary butyl-4-hydroxy hydrocinnamoyl) hydrazine, 1,3,5-tris(2,6 dimethyl 3-hydroxy 4-tertiary butyl benzyl) isocyanurate, 2,2'ethylidene bis(4,6-di-tertiary-butyl phenol), and mixtures thereof.

4. The compacted pelletized additive blend of claim 1, wherein the phosphite or phosphonite antioxidant is selected from the group consisting of tris (2,4-di-tertiary-butyl phenyl)phosphite, bis(2,4-di-tertiary-butyl phenyl)penta-erythritol diphosphite, bis(2,4-dicumyl phenyl)penta-erythritol diphosphite, tetrakis(2,4-di-tert-butylphenyl)-1,1-biphenyl-4,4'-diylbisphosphonite, and mixtures thereof.

5. The compacted pelletized additive blend of claim 1, wherein the acid neutralizing agent is selected from the group consisting of magnesium aluminum hydroxycarbonate hydrate, calcium stearate, zinc stearate, magnesium stearate, sodium stearate, lithium stearate, zinc oxide, and mixtures thereof.

6. The compacted pelletized additive blend of claim 1, wherein the granular polymer resin is selected from the group consisting of low density polyethylene, high density polyethylene, linear low density polyethylene, polypropylene homopolymer and copolymer, poly(1-butene) homopolymer and copolymer, and mixtures thereof.

7. The compacted additive blend pellet of claim 2, wherein the phenolic antioxidant is selected from the group consisting of tetrakis[methylene-3(3,5-di-tertiary butyl-4-hydroxyphenyl) propionate] methane, octadecyl-3(3,5-di-tertiary-butyl-4-hydroxyphenyl) propionate, tris (3,5-di-tertiary butyl-4-hydroxybenzyl) isocyanurate, 1,3,5-trimethyl, 2,4,6 tris (3,5 di-tertiary butyl-4-hydroxybenzyl) benzene, 1,2-bis (3,5-di-tertiary butyl-4-hydroxy hydrocinnamoyl) hydrazine, 1,3,5-tris(2,6 dimethyl 3-hydroxy 4-tertiary butyl benzyl) isocyanurate, 2,2'ethylidene bis (4,6-di-tertiary-butyl phenol), and mixtures thereof.

8. The compacted additive blend pellet of claim 7, wherein the phosphite or phosphonite antioxidant is selected from the group consisting of tris (2,4-di-tertiary-butyl phenyl) phosphite, bis(2,4-di-tertiary-butyl phenyl)penta-erythritol diphosphite, bis (2,4-dicumyl phenyl) penta-erythritol diphosphite, tetrakis(2,4-di-tert-butylphenyl)-1,1-biphenyl-4,4'-diylbisphosphonite, and mixtures thereof.

9. The compacted additive blend pellet of claim 8, wherein the acid neutralizing agent is selected from the group consisting of magnesium aluminum hydroxycarbonate hydrate, calcium stearate, zinc stearate, magnesium stearate, sodium stearate, lithium stearate, zinc oxide, and mixtures thereof.

10. The compacted additive blend pellet of claim 9, wherein the granular polymer resin is selected from the group consisting of low density polyethylene, high density polyethylene, linear low density polyethylene, polypropylene homopolymer and copolymer, poly(1-butene) homopolymer and copolymer, and mixtures thereof.

11. A solventless method for solid state compaction processing of a solid powder additive blend into pellets comprising:
    mixing one or more additives with granular polymer resin and without a solvent, to produce a starting or initial powder blend the starting blend comprising 8-55 wt % an ethoxylated amine antistatic agent having a melting temperature below about 70° C. and above about 20° C., 10-30 wt % a phenolic antioxidant, 10-30 wt % a phosphite or phosphonite antioxidant, 5-15 wt % an acid neutralizing agent, and 5-60 wt % granular polymer resin; and
    compacting the starting powder blend using a pelletizing mill with tubular die to produce compacted additive pellets by compression force,
    wherein the granular polymer resin has a median particle size greater than about 350 microns and less than about 4000 microns, and
    wherein the compacted additive pellets have an attrition index of greater than about 90%.

12. The method of claim 11, wherein the solid state compaction processing is performed using a pelletizing mill with rotating die containing tubular orifices and a fixed roller.

13. The method of claim 11, wherein the solid state compaction processing is performed using a pelletizing mill with stationary non-rotating die containing tubular orifices and rotating rollers.

14. The method of claim 11, wherein the ethoxylated amine antistatic agent has a melting temperature below about 60° C. and above about 20° C.

15. The method of claim 11, wherein the ethoxylated amine antistatic agent has a melting temperature below about 50° C. and above about 20° C.

16. The method of claim 11, wherein the granular polymer resin has a median particle size greater than about 700 microns and less than about 4000 microns.

17. The method of claim 11, wherein the granular polymer resin has a median particle size greater than about 1000 microns and less than about 4000 microns.

18. The method of claim 11, wherein the ethoxylated amine antistatic agent is octadecyl bis(2-hydroxyethyl) amine.

19. The method of claim 11, wherein the granular polymer resin is low density polyethylene (LDPE) resin granules having a median particle size greater than about 370 microns and less than 4000 microns in an amount of about 10% to about 45% by weight of the starting blend.

20. The method of claim 11, wherein the granular polymer resin is selected from the group consisting of low density polyethylene, high density polyethylene, linear low density polyethylene, polypropylene homopolymer and copolymer, poly(1-butene) homopolymer and copolymer, and mixtures thereof.

* * * * *